United States Patent
Yen et al.

(10) Patent No.: US 7,107,453 B2
(45) Date of Patent: Sep. 12, 2006

(54) AUTHENTICATABLE GRAPHICAL BAR CODES

(75) Inventors: Jonathan Yen, San Jose, CA (US); Gerald Q. Maguire, Jr., Stockholm (SE); Chit Wei Saw, Cupertino, CA (US); Yihong Xu, Marlborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1016 days.

(21) Appl. No.: 09/728,292

(22) Filed: Dec. 1, 2000

(65) Prior Publication Data

US 2001/0047476 A1 Nov. 29, 2001

(51) Int. Cl.
*H04L 9/00* (2006.01)
*G09C 3/00* (2006.01)
*G09C 5/00* (2006.01)
*G06K 9/18* (2006.01)
*G06K 9/72* (2006.01)
*G06K 9/36* (2006.01)

(52) U.S. Cl. .................. 713/180; 380/54; 382/183; 382/234

(58) Field of Classification Search ................ 380/239, 380/51, 54; 713/180–181; 382/183, 234; 283/17, 73; 359/2, 893
See application file for complete search history.

(56) References Cited

U.S. PATENT DOCUMENTS

| 4,637,051 A | 1/1987 | Clark |
| 4,777,357 A | 10/1988 | Harada |
| 4,822,986 A | 4/1989 | Guthmueller et al. |
| 4,901,073 A | 2/1990 | Kibrick |
| 4,924,078 A | 5/1990 | Sant'Anselmo et al. |
| 5,060,980 A | 10/1991 | Johnson et al. |
| 5,075,862 A | 12/1991 | Doebert et al. |
| 5,091,966 A | 2/1992 | Bloomberg et al. |
| 5,120,940 A | 6/1992 | Willsie |
| 5,153,928 A * | 10/1992 | Iizuka ........................ 382/321 |
| 5,195,123 A | 3/1993 | Clement, Jr. |
| 5,315,098 A | 5/1994 | Tow |
| 5,337,361 A | 8/1994 | Wang |
| 5,339,170 A | 8/1994 | Fan |
| 5,459,307 A | 10/1995 | Klotz, Jr. |
| 5,486,686 A | 1/1996 | Zdybel, Jr. et al. |

(Continued)

FOREIGN PATENT DOCUMENTS

EP         0909654 A      4/1999

(Continued)

OTHER PUBLICATIONS

Sabourin et al., Off-line Signature Verification by Local Granulometric Size Distributions, Sep. 1997, vol. 19 Issue 9, pp. 976-982.*

(Continued)

*Primary Examiner*—Emmanuel L. Moise
*Assistant Examiner*—Nadia Khoshnoodi

(57) ABSTRACT

Systems and methods for generating and decoding authenticatable graphical bar codes are described. In one aspect, a corroborative signed message is generated from information to be encoded, and a base image is modulated with a graphical encoding of the signed message to produce a marked image. In another aspect, a signed message is extracted from a marked image based upon a comparison of the marked image and a base image. The extracted signed message is decoded to produce a decoded message. Information encoded in the marked image is extracted from the decoded message and authenticated.

26 Claims, 6 Drawing Sheets

U.S. PATENT DOCUMENTS

| | | | |
|---|---|---|---|
| 5,490,217 A * | 2/1996 | Wang et al. | 380/51 |
| 5,513,563 A | 5/1996 | Berson | |
| 5,523,552 A | 6/1996 | Shellhammer et al. | |
| 5,527,407 A | 6/1996 | Gartland et al. | |
| 5,541,396 A | 7/1996 | Rentsch | |
| 5,544,255 A | 8/1996 | Smithies et al. | 382/119 |
| 5,550,365 A | 8/1996 | Klancnik et al. | |
| 5,591,956 A | 1/1997 | Longacre, Jr. | |
| 5,644,408 A | 7/1997 | Li et al. | |
| 5,644,655 A | 7/1997 | Windsor | 892/209 |
| 5,647,017 A | 7/1997 | Smithies et al. | 382/119 |
| 5,661,284 A | 8/1997 | Freeman | |
| 5,682,030 A | 10/1997 | Kubon | |
| 5,706,099 A | 1/1998 | Curry | |
| 5,710,636 A | 1/1998 | Curry | |
| 5,710,814 A | 1/1998 | Klemba et al. | |
| 5,765,176 A | 6/1998 | Bloomerg | 707/514 |
| 5,767,496 A | 6/1998 | Swartz et al. | |
| 5,778,076 A | 7/1998 | Kara et al. | 380/51 |
| 5,790,703 A | 8/1998 | Wang | |
| 5,799,112 A | 8/1998 | de Queriroz et al. | |
| 5,801,944 A | 9/1998 | Kara | |
| 5,818,955 A | 10/1998 | Smithies et al. | 382/115 |
| 5,818,970 A | 10/1998 | Ishikawa et al. | |
| 5,819,240 A | 10/1998 | Kara | |
| 5,828,772 A * | 10/1998 | Kashi et al. | 382/119 |
| 5,835,615 A | 11/1998 | Lubow et al. | |
| 5,838,814 A * | 11/1998 | Moore | 382/115 |
| 5,866,895 A | 2/1999 | Fukuda et al. | |
| 5,871,288 A | 2/1999 | Ryan et al. | |
| 5,880,451 A | 3/1999 | Smith et al. | |
| 5,897,669 A | 4/1999 | Matsui | |
| 5,898,166 A | 4/1999 | Fukuda et al. | |
| 5,912,745 A | 6/1999 | Ulichney | |
| 5,946,414 A | 8/1999 | Cass | |
| 5,946,415 A | 8/1999 | Su et al. | |
| 5,953,426 A | 9/1999 | Windel et al. | |
| 5,974,147 A | 10/1999 | Cordery et al. | 380/25 |
| 5,974,200 A | 10/1999 | Zhou et al. | |
| 5,982,506 A * | 11/1999 | Kara | 358/405 |
| 5,982,896 A | 11/1999 | Cordery et al. | |
| 5,996,893 A | 12/1999 | Soscia | |
| 6,032,861 A | 3/2000 | Lemelson et al. | |
| 6,064,738 A | 5/2000 | Fridrich | |
| 6,064,751 A | 5/2000 | Smithies et al. | 382/115 |
| 6,064,764 A | 5/2000 | Bhaskaran et al. | |
| 6,091,835 A | 7/2000 | Smithies et al. | 382/115 |
| 6,116,510 A | 9/2000 | Nishino | |
| 6,141,441 A | 10/2000 | Cass et al. | |
| 6,141,450 A | 10/2000 | Chen et al. | |
| 6,151,590 A | 11/2000 | Cordery et al. | |
| 6,172,773 B1 | 1/2001 | Ulichney | |
| 6,175,827 B1 | 1/2001 | Cordery et al. | |
| 6,193,158 B1 | 2/2001 | Hecht et al. | |
| 6,201,901 B1 | 3/2001 | Zhou et al. | |
| 6,212,281 B1 * | 4/2001 | Vanstone | 380/282 |
| 6,212,504 B1 | 4/2001 | Hayosh | |
| 6,240,196 B1 | 5/2001 | Fischer et al. | |
| 6,240,212 B1 | 5/2001 | Son et al. | |
| 6,252,675 B1 | 6/2001 | Jacobs | |
| 6,256,398 B1 | 7/2001 | Chang | |
| 6,263,086 B1 | 7/2001 | Wang | |
| 6,307,955 B1 * | 10/2001 | Zank et al. | 382/121 |
| 6,311,214 B1 | 10/2001 | Rhoads | |
| 6,345,104 B1 | 2/2002 | Rhoads | |
| 6,364,209 B1 | 4/2002 | Tatsuta et al. | |
| 6,373,587 B1 | 4/2002 | Sansone | |
| 6,398,117 B1 | 6/2002 | Oakeson et al. | |
| 6,427,021 B1 | 7/2002 | Fischer et al. | |
| 6,430,302 B1 | 8/2002 | Rhoads | |
| 6,457,651 B1 | 10/2002 | Paul et al. | |
| 6,470,096 B1 | 10/2002 | Davies et al. | |
| 6,493,110 B1 | 12/2002 | Roberts | |
| 6,510,997 B1 | 1/2003 | Wilz et al. | |
| 6,526,155 B1 | 2/2003 | Wang | |
| 6,601,172 B1 * | 7/2003 | Epstein | 713/178 |
| 6,611,598 B1 * | 8/2003 | Hayosh | 380/54 |
| 6,611,623 B1 | 8/2003 | Konishi et al. | |
| 6,748,533 B1 * | 6/2004 | Wu et al. | 713/176 |
| 6,938,017 B1 | 8/2005 | Yen et al. | |
| 2001/0047476 A1 | 11/2001 | Yen et al. | |

FOREIGN PATENT DOCUMENTS

| | | | |
|---|---|---|---|
| JP | 08185451 A * | 7/1996 | |
| WO | WO 0011599 | 3/2000 | |
| WO | WO0011599 A | 3/2000 | |

OTHER PUBLICATIONS

Sabourin et al., Pattern Spectrum as a Local Shape Factor for Off-line Signature Verification, Aug. 1996, vol. 3, pp. 43-48.*

Sabourin et al., An Extended-Shadow-Code Based Approach for Off-line Signature Verification. I. Evaluation of the Bar Mask Definition, Oct. 1994, vol. 2, pp. 450-453.*

Zhigang Fan, "Dot-to-dot error diffusion," Journal of Electronic Imaging, vol. 2(1) (Jan. 1993).

N. Damera-Venkata and B. L. Evans, "FM Halftoning Via Block Error Diffusion," Proc. IEEE International Conference on Image Processing, Oct. 7-10, 2001, vol. II, pp. 1081-1084, Thessaloniki, Greece.

Antognini et al., "A Flexibly Configurable 2D Bar Code," pp. 1-36 (Before May 25, 2000) (http://www.paperdisk.com/ibippa-pr.htm).

* cited by examiner

AUTHENTICATABLE GRAPHICAL BAR CODES

CROSS-REFERENCE TO RELATED APPLICATIONS

Under 35 U.S.C. § 120 this application claims the benefit of co-pending U.S. patent application Ser. No. 09/579,070, filed May 25, 2000, by Doron Shaked et al., and entitled "A Method and Apparatus for Generating and Decoding a Visually Significant Bar Code," which is incorporated herein by reference.

TECHNICAL FIELD

This invention relates to authenticatable graphical bar codes.

BACKGROUND

A bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying the bar code patterns in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Bar codes may be used in a variety of applications, including low information content applications (e.g., automatic price tagging and inventory management), and relatively high information content applications (e.g., encoding mail addresses and postage for automated mail reading and mail distribution systems, and encoding compressed content of a printed page).

In many applications, it is desirable to authenticate the source of information or the information itself, or both. For example, in order to create certain written instruments (e.g., a bank draft or check authorizing the withdrawal of money from a bank account, or a postage indicia printed on an envelope) it is necessary to authenticate the source of the information creating the instrument (e.g., the identity of person authorizing the bank withdrawal or printing the postage indicia). In addition, in certain applications there is a need to verify whether a communication received by a recipient is the actual communication that was sent by the sender (i.e., that a communication has not been intercepted, modified, or replaced).

SUMMARY

The invention features an inventive scheme (systems and methods) for generating and decoding authenticatable graphical bar codes.

In one aspect, the invention features a bar coding method in accordance with which a corroborative signed message is generated from information to be encoded, and a base image is modulated with a graphical encoding of the signed message to produce a marked image.

As used herein, the term "corroborative signed message" refers broadly to a message by which the sender of information or the information itself, or both, may be authenticated.

Embodiments of the invention may include one or more of the following features.

The step of generating the signed message preferably includes producing a cryptographic hash from the information to be encoded. The cryptographic hash may be produced by passing the information to be encoded through a one-way function, such as SHA or MD5. The step of generating the signed message preferably also includes encrypting the cryptographic hash to produce a digital signature. The cryptographic hash may be encrypted with a private key. The step of generating the signed message may include concatenating the information to be encoded and the digital signature. The signed message may include a public key certificate.

In one embodiment, the base image includes an image of a handwritten signature. The base image modulating step may include vectorizing the handwritten signature image. A set of base control points may be obtained for the vectorized handwritten signature image, and the information may be encoded by displacing the base control points to obtain a marked set of control points from which the marked image is produced.

In some embodiments, the base image modulating step includes modulating a halftoning process based upon the information to be encoded.

The signed message may be extracted from the marked image. The signed message preferably is extracted from the marked image based upon a comparison of the marked image and the base image. The extracted signed message may be decoded to produce a decoded message. An original encrypted cryptographic hash and the encoded information may be extracted from the decoded message. The encrypted cryptographic hash may be decrypted with a public key. The extracted information may be authenticated by producing a new cryptographic hash from the extracted information, and comparing the new cryptographic hash with the original cryptographic hash.

In another aspect of the invention, a signed message is extracted from a scanned image based upon a comparison of the marked image and a base image. The extracted signed message is decoded to produce a decoded message. Information encoded in the marked image is extracted from the decoded message.

An encrypted original cryptographic hash may be extracted from the decoded message. The encrypted original cryptographic hash may be decrypted with a public key. The extracted information may be authenticated by producing a new cryptographic hash from the extracted information, and comparing the new cryptographic hash with the original cryptographic hash.

In another aspect, the invention features a computer program residing on a computer-readable medium. The computer program comprises computer-readable instructions for causing a computer to generate a corroborative signed message from information to be encoded, and to modulate a base image with a graphical encoding of the signed message to produce a marked image.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1A:
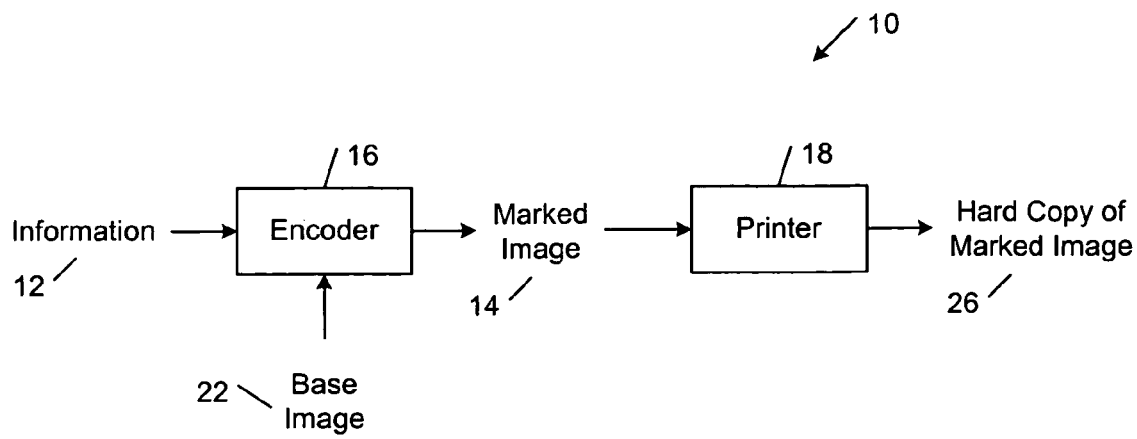
FIG. 1A is a diagrammatic view of a system for encoding information into a marked image.
Figure 1B:
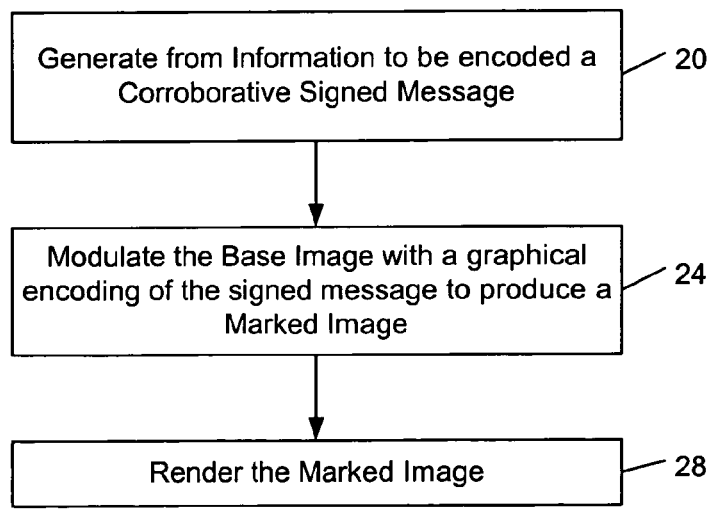
FIG. 1B is a flow diagram of a method of encoding information into a marked image.

Referring to FIGS. 1A and 1B, in one embodiment, a system 10 for encoding information 12 into a marked image 14 includes an encoder 16 and a printer 18.

Encoder 16 may be a computer or other programmable processor, and printer 18 may be a conventional printer (e.g., a LaserJet® printer available from Hewlett-Packard Company of Palo Alto, Calif., U.S.A.) or a special-purpose label printing device. In operation, encoder 16 generates a corroborative signed message from information 12 (step 20). Encoder 16 modulates a base image 22 with a graphical encoding of the signed message to produce marked image 14 (step 24). Base image 22 may be any graphical pattern, including a logo (e.g., a company logo), graphics, pictures, text, images, or any pattern that has visual significance. The signed message may be embedded in the graphical design of text, pictures, images, borders, or the background of base image 22 to produce marked image 14. The information may be embedded in marked image 14 in the form of a binary image (e.g., a black and white dot pattern), a multilevel image (e.g., a gray-level image), or a multilevel color image. Printer 18 renders a hard copy 26 of marked image 14 that may be transferred physically from a sender to a recipient (step 28). Hard copy 26 may be in the form of any one of a wide variety of printed materials, including a bank draft (or check) carrying a marked image of a withdrawal authorization signature, a stock certificate or bond carrying a marked image of an authenticity certification, and an envelope carrying a marked image of postage indicia. In other embodiments, marked image 14 may be rendered by other printing processes. Alternatively, marked image 14 may be rendered in an electronic format.

Figure 2:
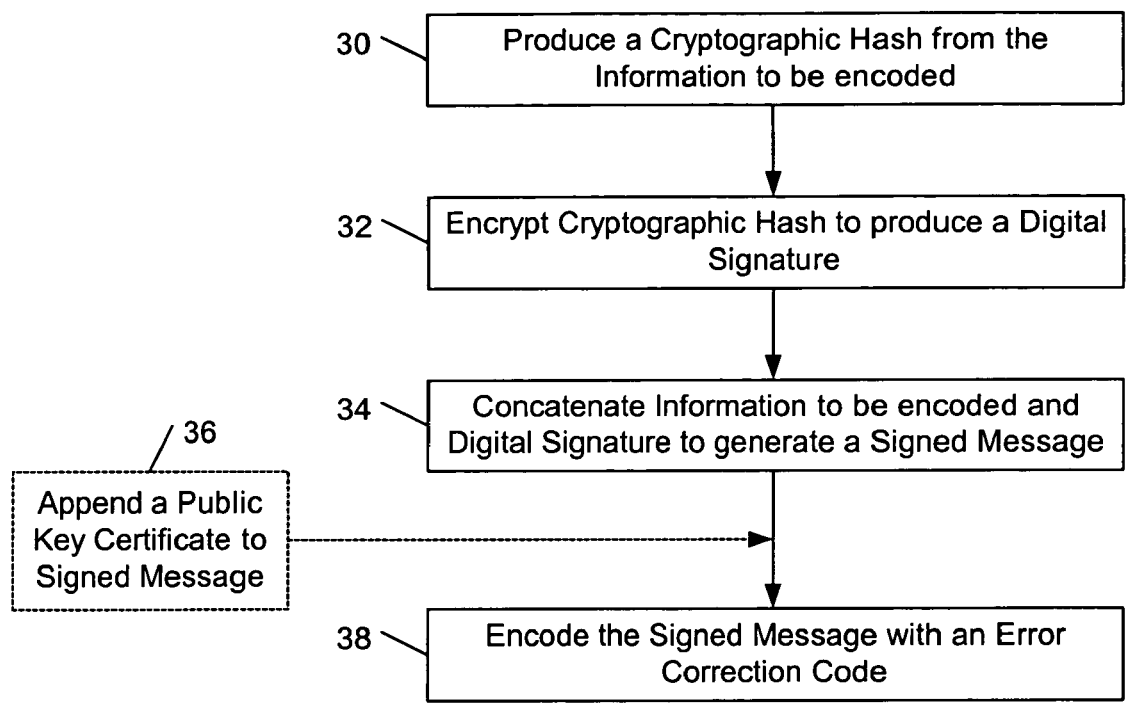
FIG. 2 is a flow diagram of a method of generating a corroborative signed message from information to be encoded.

Referring to FIG. 2, in one embodiment, encoder 16 may be programmed to generate a corroborative signed message from information 12 as follows. Encoder 16 produces a cryptographic hash from information 12 (step 30). The cryptographic hash may be generated by passing information 12 through a one-way encryption process (or digesting process), such as a hashing routine. Preferably, the digesting process is configured such that the probability that two different electronic documents will generate the same cryptographic hash is very low. Encoder 16 encrypts the cryptographic hash to produce a digital signature (step 32). In an asymmetric (public key) cryptographic embodiment, the cryptographic hash is encrypted with the sender's private key. Encoder 16 concatenates information 12 and the digital signature to generate a signed message (step 34). In some embodiments, a public key certificate is appended to the signed message (step 36). The public key certificate may be issued by a certification authority. The public key certificate may contain a certification by a certification authority that a particular public key is the public key of a particular entity (e.g., the sender), and that this entity is the holder of the corresponding private key. In addition, the public key certificate may contain, among other items, the name of the certification authority, the name of the certificate holder, the expiration date of the certificate, the public key of the certificate holder, and a digital signature generated by the certification authority. As used herein, the term "signed message" refers to a signed message with or without an appended public key certificate. Encoder 16 encodes the resulting signed message with an error correction code (step 38). The error correction code may be a conventional convolutional (tree) code or a conventional block code. For example, the error correction code may be a standard 16→31 bit BCH code that corrects for three errors.

Figure 3A:
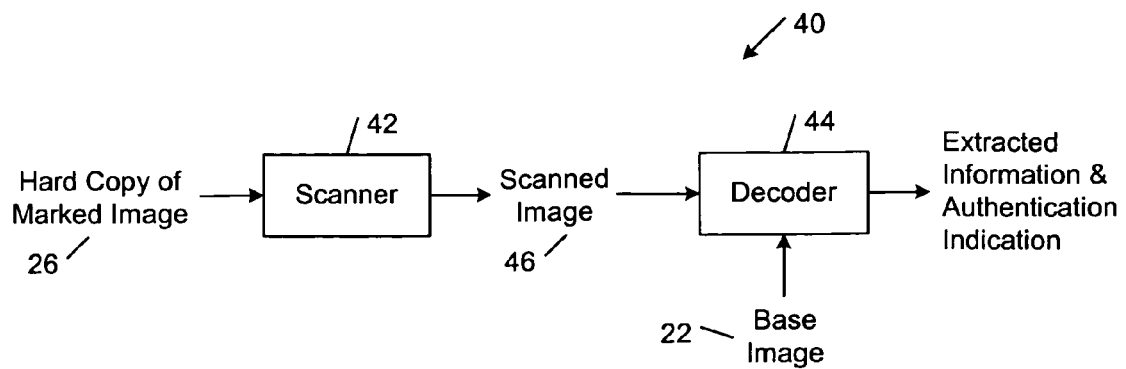
FIG. 3A is a diagrammatic view of a system for extracting information from a marked image.
Figure 3B:
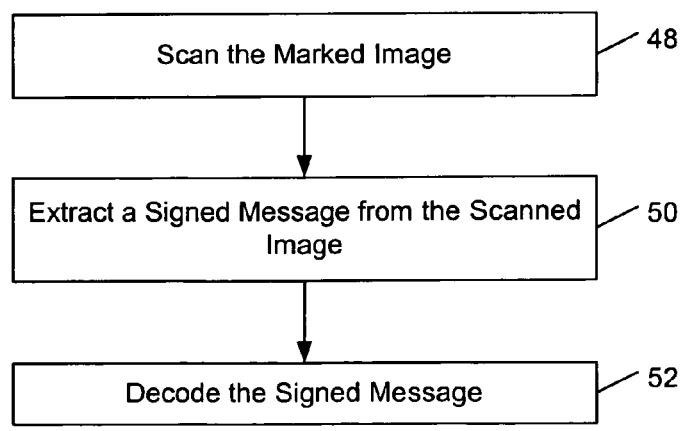
FIG. 3B is a flow diagram of a method of extracting information from a marked image.

As shown in FIGS. 3A and 3B, in one embodiment, a system 40 for decoding information 12 from marked image 14 includes a scanner 42 and a decoder 44. Scanner 42 may be a conventional desktop optical scanner (e.g., a ScanJet® scanner available from Hewlett-Packard Company of Palo Alto, Calif., U.S.A.) or a portable scanner (e.g., a CapShare® portable scanner available from Hewlett-Packard Company of Palo Alto, Calif., U.S.A.). Decoder 44 may be a computer or other programmable processor. In operation, scanner 42 reads hard copy 26 to produce a digitized scanned image 46 that includes marked image 14 (step 48). Decoder 44 extracts a signed message from scanned image 46 based upon a comparison of scanned image 46 and base image 22 (step 50). Decoder 44 decodes the signed message to produce a decoded message (step 52). The signed message may be decoded using a conventional error correction code decoding process.

Figure 4:
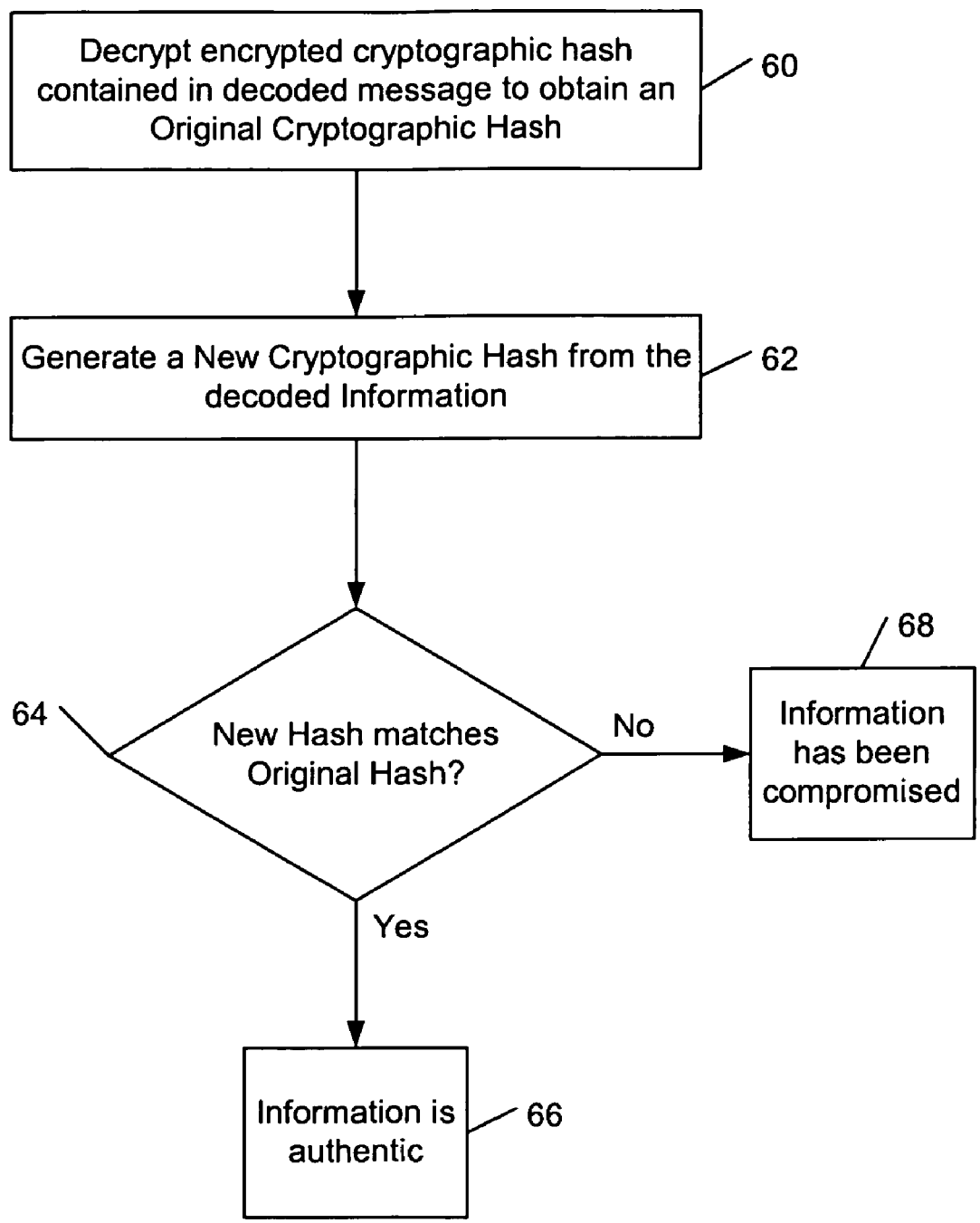
FIG. 4 is a flow diagram of a method of authenticating information extracted from a marked image.

Referring to FIG. 4, in one embodiment, information extracted from a marked image may be authenticated as follows. Decoder 44 decrypts the encrypted cryptographic hash contained in the decoded message to obtain an original cryptographic hash (step 60). The encrypted cryptographic hash may be decrypted, for example, using the sender's public key, which may be obtained from an appended public key certificate or may be obtained in some other way. Decoder 44 also generates a new cryptographic hash from the information contained in the decoded message using the same digesting process that was used to produce the original cryptographic hash (step 62). Decoder 44 compares the original cryptographic hash with the new cryptographic hash (step 64). If the new cryptographic hash matches the original cryptographic hash, the information is authentic (step 66). That is, the information was digitally signed by the private key corresponding to the public key that was used to recover the original cryptographic hash, and the information was not changed from the time that it was signed to the time that the digital signature was verified. Thus, the authentication process of FIG. 4 may be used to verify the authenticity of information 12 or the identity of the sender of information 12, or both. If the new cryptographic hash does not match the original cryptographic hash (step 64), the information has been compromised (step 68).

If a public key certificate is appended to the extracted signed message, the public key certificate may provide a level of assurance as to the identity of the holder of the private key corresponding to a particular public key. The authenticity of the public key certificate may be tested by verifying the certification authority's digital signature using the certification authority's public key.

Figure 5A:
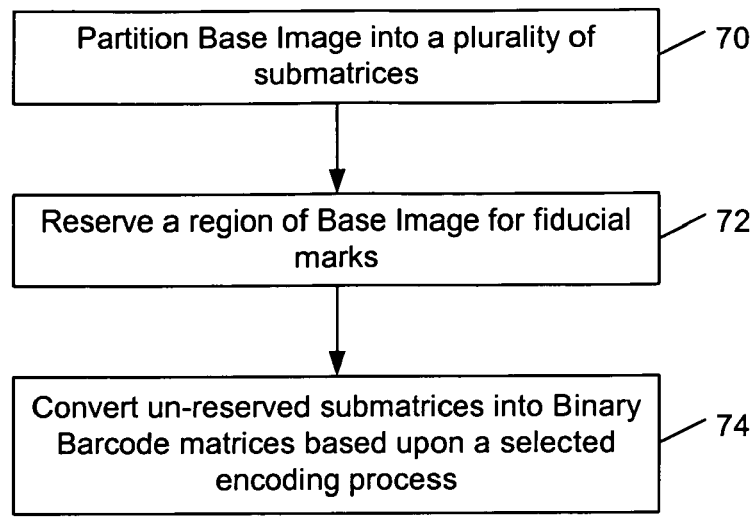
FIG. 5A is a flow diagram of a method of rendering a base image with a graphical encoding of a signed message.
Figure 5B:
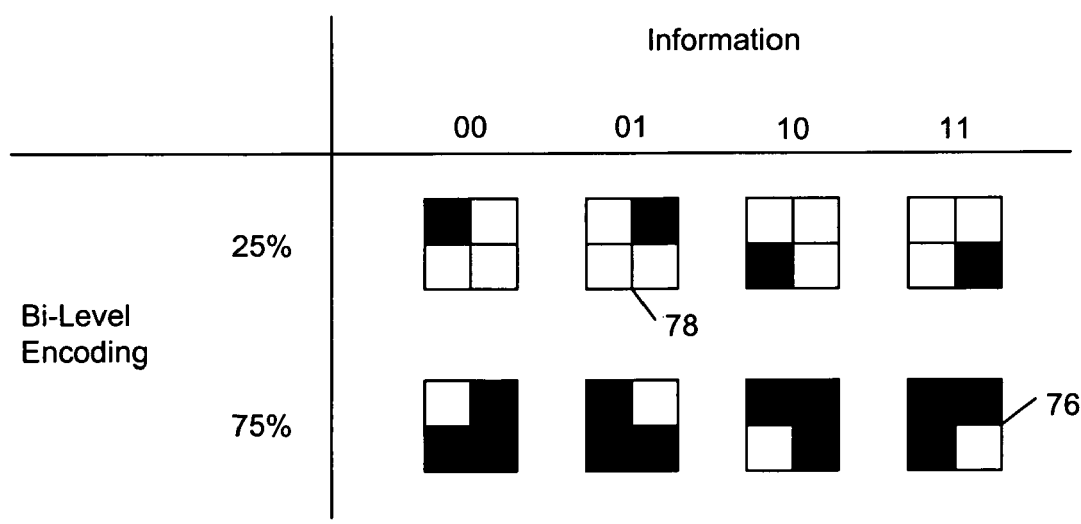
FIG. 5B is a table mapping information to a two-bit bi-level graphical code.

Referring to FIGS. 5A and 5B, base image 22 may be rendered with a graphical encoding of a signed message in accordance with the graphical encoding scheme described in co-pending U.S. patent application Ser. No. 09/579,070, filed May 25, 2000, by Doron Shaked et al., and entitled "A Method and Apparatus for Generating and Decoding a Visually Significant Bar code." In accordance with this graphical encoding process, base image 22 is partitioned into a plurality of sub-matrices (step 70). A region of base image 22 is reserved for fiducial markings (step 72). Unreserved sub-matrices are converted into binary bar code matrices based upon a selected encoding process (step 74). For example, in one graphical encoding embodiment, information may be encoded into a bi-level image by a two-bit encoding process based upon the two-by-two halftone patterns (or matrices) illustrated in FIG. 5B. In accordance with this graphical encoding process, sub-matrices in base image 22 undergo a thresholding process and a bi-level half-toning process. For example, in one embodiment, sub-matrices in base image 22 that have a gray level that is less than 50% are encoded with one of the four bar code matrices in the 25% row of FIG. 5B. Sub-matrices in base image 22 that have a gray level that is at least 50% are encoded with one of the four bar code matrices in the 75% row of FIG. 5B. In other embodiments, the encoding threshold level may be greater than or less than 50%. The particular bar code matrix used to render a sub-matrix of base image 22 is selected base upon the information to be encoded. For example, if "11" is to be encoded at a 75% gray level sub-matrix location, bar code matrix 76 is used to render that sub-matrix. Similarly, if "01" is to be encoded at a 25% gray level sub-matrix location, bar code matrix 78 is used to render that sub-matrix.

In general, the graphical encoding process of FIGS. 5A and 5B may be extended to n-bit encoding mappings, where n has an integer value of 1 or greater. For example, in one embodiment, information is encoded by a five-bit encoding process based upon three-by-three halftone patterns.

Figure 6A:
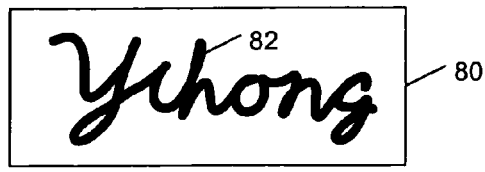
FIG. 6A is a base image containing an image of a handwritten signature.
Figure 6B:
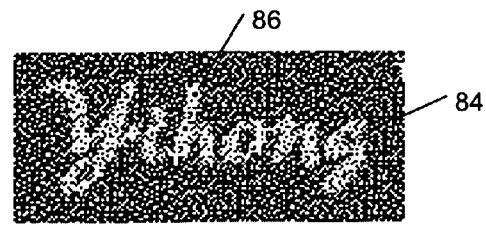
FIG. 6B is a marked image containing a signed message encoded in a likeness of the handwritten signature of FIG. 6A in accordance with the encoding process of FIG. 5B.

As shown in FIGS. 6A and 6B, the graphical encoding process of FIGS. 5A and 5B may be used to render a base image 80 that contains an image 82 of a handwritten signature (FIG. 6A). The resulting marked image 84 contains a signed message encoded in a likeness 86 of handwritten signature 82 (FIG. 6B). The signed message may be encoded in the handwritten signature likeness 86, the background image, or both.

Figure 7A:
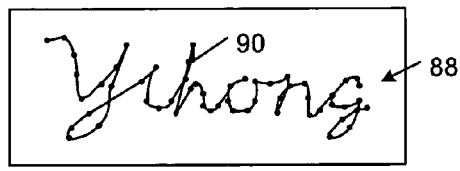
FIG. 7A is an image of a spline-fitted version of the handwritten signature of FIG. 6A.
Figure 7C:
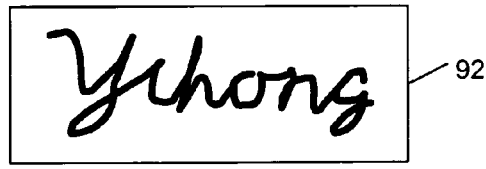
FIG. 7C is a marked image containing a signed message encoded in a likeness of the handwritten signature of FIG. 6A in accordance with the encoding process of FIG. 7B.
Figure 7B:
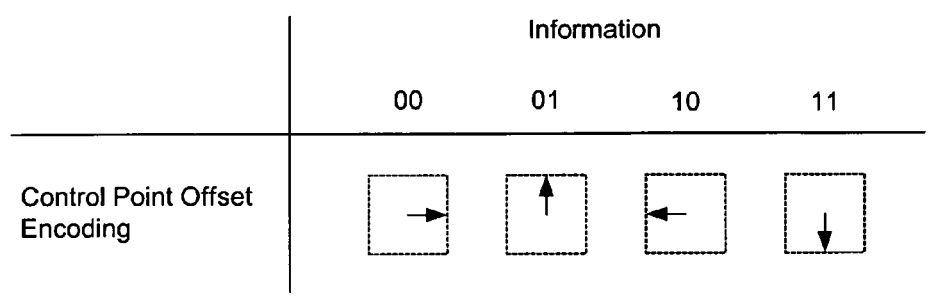
FIG. 7B is a table mapping information to a two-bit control point offset code.

Referring to FIGS. 7A–7C, in another graphical encoding embodiment, handwritten signature image 82 may be rendered with a graphical encoding of a signed message using a vector-based encoding process that is invariant through linear transformations. In particular, handwritten signature image 82 may be converted from a raster form image to a vector form image 88. This conversion process may be implemented using a standard vector graphics software program (e.g., the Adobe® Illustrator® graphics creation software available from Adobe Systems Incorporated of San Jose, Calif., U.S.A.) or another graphics software program having functionality that is similar to the Postscript "curveto" operator. As shown in FIG. 7A, the spline-fitted handwritten signature image 88 consists of a sequence of spline curves governed by a plurality of control points 90. The signed message is encoded in a marked image 92 by a controlled displacement of control points 80. For example, in a two-bit encoding embodiment, control points 90 are linked into a poly-line (i.e., a chain-coded sequence) with a deterministic sequence (e.g., clockwise or counter-clockwise). One or more control points 90 are grouped together, and each group is displaced in accordance with the information to be encoded based upon the mapping of FIG. 7B. For example, if "11" is to be encoded in a particular group of control points, the control point group is displaced one unit in a downward direction. Similarly, if "01" is to be encoded in a particular group of control points, the control point group is displaced one unit in an upward direction. Because the encoding is achieved by only minor displacements of control points 90, the resulting marked image 92 appears to be very similar to handwritten signature image 82.

In other embodiments, different vector-based encoding schemes may be used. For example, in a one-bit encoding embodiment, groups of control points are displaced in a binary manner (e.g., stationary or displaced, displaced in a leftward direction or displaced in a rightward direction, displaced in an upward direction or displaced in a downward direction). A three-bit encoding embodiment may incorporate diagonal displacements into the encoding scheme of FIG. 7B.

In sum, the above-described embodiments provide a novel approach for authenticating information that is embedded in a graphical bar code. These embodiments enable bar codes having visual significance to be generated in a manner that allows the source of information or the information itself, or both, to be authenticated. In this way, these embodiments readily may be applied to various applications, including authorization markings printed on a bank draft or check, and postage indicia printed on an envelope.

The systems and methods described herein are not limited to any particular hardware or software configuration, but rather they may be implemented in any computing or processing environment. The encoding and decoding processes described above may be implemented in a high level procedural or object oriented programming language, or in assembly or machine language; in any case, the programming language may be a compiled or interpreted language.

Other embodiments are within the scope of the claims.

For example, although the above embodiments are described with respect to an asymmetric (public key) cryptographic embodiment, other embodiments may be implemented using a symmetric (secret key) cryptographic scheme in which the cryptographic hash is encrypted with the sender's secret key. In addition, although the above embodiments are described with respect to fixed-pattern halftoning methods, other embodiments may utilize different halftoning methods, including cluster dithering (e.g., blue noise) methods and error diffusion methods.

Still other embodiments are within the scope of the claims.

What is claimed is:

1. A machine-implemented bar coding method, comprising:
   generating a corroborative signed message from information to be encoded; and
   converting a base image into a marked image containing a graphical encoding of the signed message by
      dividing the base image into multiple image areas,
      segmenting at least some of the image areas into multiple groups based on pixel values in the image areas, and
      encoding the segmented image areas with sets of two-dimensional code patterns to graphically encode the corroborative signed message in the marked image, wherein each set of code patterns encodes a respective corresponding group of image areas.

2. The method of claim 1, wherein generating the signed message comprises producing a cryptographic hash from the information to be encoded.

3. The method of claim 2, wherein generating the signed message comprises encrypting the cryptographic hash to produce a digital signature.

4. The method of claim 3, wherein the cryptographic hash is encrypted with a private key.

5. The method of claim 3, wherein generating the signed message comprises concatenating the information to be encoded and the digital signature.

6. The method of claim 1, wherein the signed message includes a public key certificate.

7. The method of claim 1, wherein the base image includes an image of a handwritten signature, and the converting comprises converting the base image including the image of the handwritten signature into a marked image having a visual appearance that resembles the base image and contains a graphical encoding of the signed message.

8. The method of claim 7, wherein the converting comprises converting the handwritten signature image into a vector form image.

9. The method of claim 8, further comprising obtaining a set of base control points for the vector form image, and encoding the information by displacing the base control points to obtain a marked set of control points from which the marked image is produced.

10. The method of claim 8, wherein the converting of the handwritten signature image comprises fitting a sequence of spline curves to the handwritten signature.

11. The method of claim 1, further comprising extracting the signed message from the marked image.

12. The method of claim 11, wherein the signed message is extracted from the marked image based upon a comparison of the marked image and the base image.

13. The method of claim 11, further comprising decoding the extracted signed message to produce a decoded message.

14. The method of claim 13, further comprising extracting from the decoded message an encrypted original cryptographic hash and the encoded information.

15. The method of claim 14, further comprising decrypting the encrypted original cryptographic hash with a public key.

16. The method of claim 15, further comprising authenticating the extracted information by producing a new cryptographic hash from the extracted information, and comparing the new cryptographic hash with the original cryptographic hash.

17. The method of claim 1, wherein the marked image has a visual appearance that resembles the base image.

18. The method of claim 1, wherein the marked image corresponds to a withdrawal authorization signature for a bank draft, and further comprising rendering the marked image on the bank draft.

19. The method of claim 1, wherein the marked image corresponds to an authentication certification for a financial instrument, and further comprising rending the marked image on the financial instrument.

20. The method of claim 1, wherein the marked image corresponds to a postage indicium for an envelope, and further comprising rendering the marked image on the envelope.

21. A bar coding system, comprising an encoder configured to:
   generate a corroborative signed message from information to be encoded; and
   convert a base image into a marked image containing a graphical encoding of the signed message by
      dividing the base image into multiple image areas,
      segmenting at least some of the image areas into multiple groups based on pixel values in the image areas, and
      encoding the segmented image areas with sets of two-dimensional code patterns to graphically encode the corroborative signed message in the marked image, wherein each set of code patterns encodes a respective corresponding group of image areas.

22. The system of claim 21, wherein the base image includes an image of a handwritten signature, and the encoder is configured to convert the handwritten signature image into a vector form image.

23. The system of claim 22, wherein the encoder is configured to obtain a set of base control points for the vector form image and encode the information by displacing the base control points to obtain a marked set of control points from which the marked image is produced.

24. A computer program residing on a computer-readable medium and comprising computer-readable instructions for causing a computer to:
   generate a corroborative signed message from information to be encoded; and
   convert a base image into a marked image containing a graphical encoding of the signed message by
      dividing the base image into multiple image areas,
      segmenting at least some of the image areas into multiple groups based on pixel values in the image areas, and
      encoding the segmented image areas with sets of two-dimensional code patterns to graphically encode the corroborative signed message in the marked image, wherein each set of code patterns encodes a respective corresponding group of image areas.

25. The computer program of claim 24, wherein the base image includes an image of a handwritten signature, and the computer-readable instructions cause the computer to convert the handwritten signature image into a vector form image.

26. The computer program of claim 24, wherein the computer-readable instructions cause the computer to obtain a set of base control points for the vector form image and encode the information by displacing the base control points to obtain a marked set of control points from which the marked image is produced.

* * * * *